(12) United States Patent
Verma et al.

(10) Patent No.: US 11,803,310 B2
(45) Date of Patent: Oct. 31, 2023

(54) TAGGING A LAST KNOWN GOOD UPGRADE EVENT FOR AUTOMATIC ROLLBACK BASED ON DETECTED REGRESSION

(71) Applicant: MICROSOFT TECHNOLOGY LICENSING, LLC, Redmond, WA (US)

(72) Inventors: Nidhi Verma, Redmond, WA (US); Daniel Oh, Redmond, WA (US); Amber Litteken, Seattle, WA (US); Rahul Nigam, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 230 days.

(21) Appl. No.: 17/243,465

(22) Filed: Apr. 28, 2021

(65) Prior Publication Data

US 2022/0350509 A1    Nov. 3, 2022

(51) Int. Cl.
*G06F 9/44* (2018.01)
*G06F 3/06* (2006.01)
*G06F 9/445* (2018.01)

(52) U.S. Cl.
CPC ............ *G06F 3/0632* (2013.01); *G06F 3/067* (2013.01); *G06F 3/0617* (2013.01); *G06F 9/44536* (2013.01)

(58) Field of Classification Search
CPC ...... G06F 3/0632; G06F 3/0617; G06F 3/067; G06F 8/65; G06F 8/70; G06F 8/71;
(Continued)

(56) References Cited

U.S. PATENT DOCUMENTS 9,992,064 B1   6/2018   Chawla et al.
10,255,058 B2   4/2019   Frank et al.
(Continued)

OTHER PUBLICATIONS

Rollbacks,Gradual Rollouts,andTraffic Migration,RetrievedFrom:https://Aweb.archive.org/web/20201101081347/ittps:/cloud.google.com/run/docs/rollouts-rollbacks-traffic-migration, Nov. 1, 2020,5Pages.*
(Continued)

*Primary Examiner* — Ilwoo Park
(74) *Attorney, Agent, or Firm* — Newport IP, LLC; Jacob P. Rohwer

(57) ABSTRACT

Disclosed herein is a system for improving the user experience in the face of a regression by returning resources that offer a service to a "last known good" upgrade. In other words, the state of the resources is reconfigured to scale back from recent upgrade(s), the deployments of which likely caused the regression, to a previous upgrade that is known to have little or no effect on the user experience. To identify a problem, the system collects performance data from different resource units that make up a cloud-based platform. The performance data is collected for each upgrade event in a sequence of upgrade events that are currently deployed or being deployed. The system continually tracks and analyzes qualification data collected for each of the deployed upgrade events. The system can tag an upgrade event as the last known good upgrade event when the collected qualification data satisfies predefined qualifications.

20 Claims, 9 Drawing Sheets

(58) Field of Classification Search
CPC .. G06F 9/44536; G06F 11/30; G06F 11/3051; G06F 11/3055; G06F 11/3065; G06F 11/3089; G06F 11/3096; G06F 11/34; G06F 11/3409; G06F 11/3452; G06F 11/3466; G06F 11/3476; G06F 11/36–3692
USPC .......... 710/19; 711/154; 713/1, 100; 714/15, 714/19–21, 47.1–47.3; 717/168, 170
See application file for complete search history.

(56) References Cited

U.S. PATENT DOCUMENTS

| | | | |
|---|---|---|---|
| 10,445,196 | B2 | 10/2019 | Patil et al. |
| 11,063,916 | B1* | 7/2021 | Ferreira ............... G05B 19/054 |
| 2014/0047085 | A1* | 2/2014 | Peters .................. G06Q 30/06 709/221 |
| 2018/0349130 | A1* | 12/2018 | Mohammed ........... H04L 41/40 |
| 2020/0019400 | A1* | 1/2020 | Zhao ................... G06F 11/1433 |
| 2020/0379837 | A1 | 12/2020 | Krishnaswamy et al. |
| 2022/0156057 | A1* | 5/2022 | Kobayashi ............... G06F 8/65 |

OTHER PUBLICATIONS

UpdatingaDeployment,RetrievedFrom:https:/Aveb.archive.org/web/202011250227211/https:/cloud.google.com/leployment-manager/docs/deployments/updating-deployments,Nov. 25, 2020,11Pages.*
"AWS CodeDeploy", Retrieved From: https://docs.aws.amazon.com/codedeploy/latest/userguide/codedeploy-user.pdf#deployments-rollback-and-redeploy, Oct. 6, 2014, 471 Pages.
"Rollbacks, Gradual Rollouts, and Traffic Migration", Retrieved From: https://web.archive.org/web/20201101081347/https:/cloud.google.com/run/docs/rollouts-rollbacks-traffic-migration, Nov. 1, 2020, 5 Pages.
"Updating a Deployment", Retrieved From: https://web.archive.org/web/20201125022211/https:/cloud.google.com/deployment-manager/docs/deployments/updating-deployments, Nov. 25, 2020, 11 Pages.
Gao, et al., "Rollback on Error to Successful Deployment", Retrieved From: https://docs.microsoft.com/en-us/azure/azure-resource-manager/templates/rollback-on-error, Feb. 2, 2021, 5 Pages.
"International Search Report and Written Opinion Issued in PCT Application No. PCT/US22/023227", dated Jul. 8, 2022, 10 Pages.

* cited by examiner

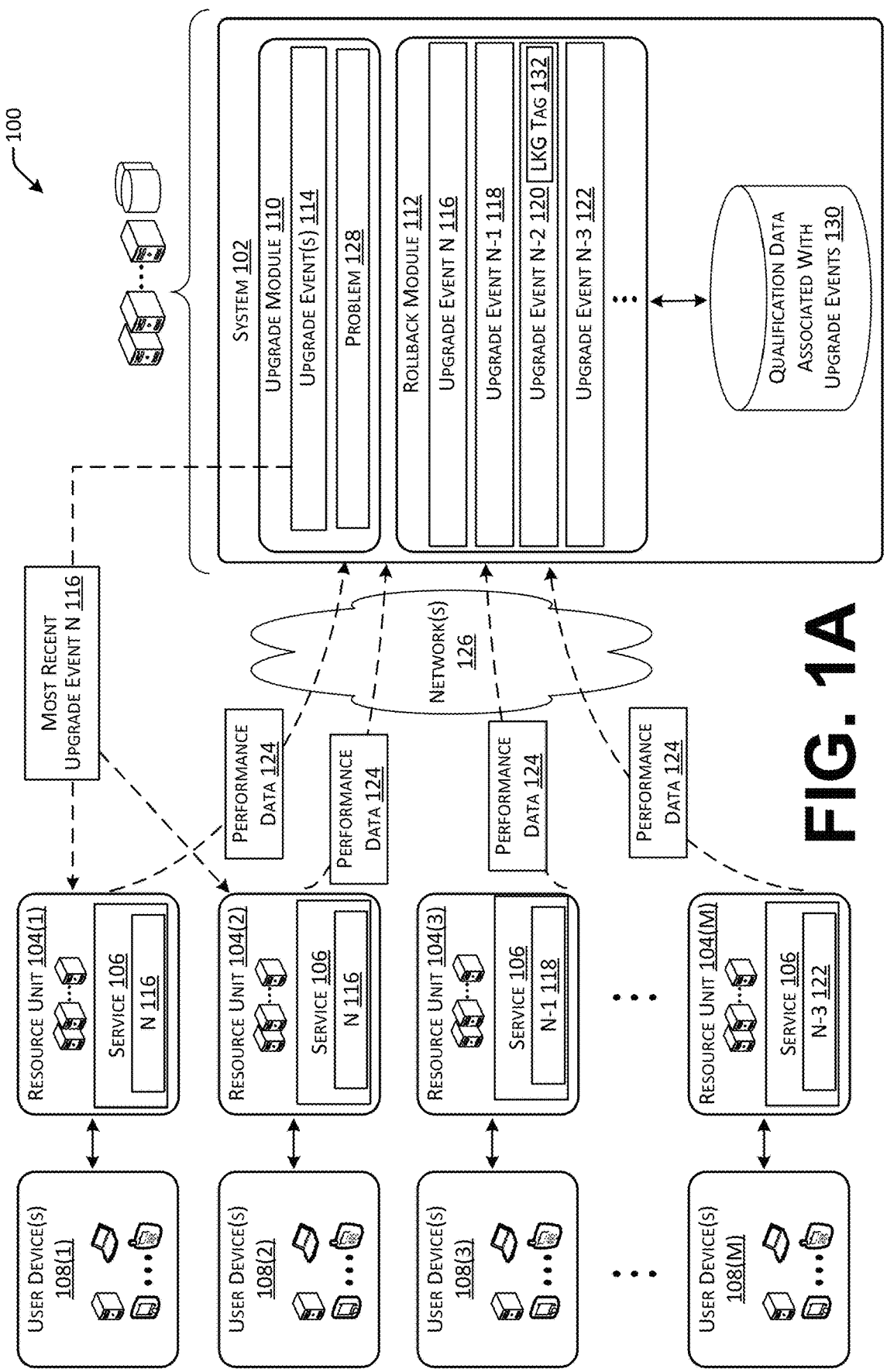

TAGGING A LAST KNOWN GOOD UPGRADE EVENT FOR AUTOMATIC ROLLBACK BASED ON DETECTED REGRESSION

BACKGROUND

Providing an optimal user experience is an important aspect for cloud-based platforms that offer network services. As cloud computing gains popularity, more and more data and/or services are stored and/or provided online via network connections. In many scenarios, a cloud-based platform may provide a service to thousands or millions of users (e.g., customers, clients, etc.) geographically dispersed around a country, or even the world. In order to provide this service, a cloud-based platform often includes different resources, such as server farms, hosted in various datacenters.

In order to continue to improve the user experience and/or provide an optimal user experience, an entity providing the service may frequently deploy upgrades to the different resources. The upgrades may include updated code and/or other mechanisms configured to maintain, correct, add, and/or remove functionality (e.g., a feature) associated with the service provided. Unfortunately, these frequently deployed upgrades may encounter an increased likelihood of introducing or causing regressions, which may be referred to herein as problems, that can result in functionality loss and/or sub-optimal experiences for the users being served by the resources executing the updated code.

Typically, an entity providing the service uses an engineering team to manually monitor telemetry data associated with the health of the resources in order to identify an anomaly that signals a regression, and to determine a root cause of the regression. More specifically, the engineering team includes analysts (e.g., on-call engineers, service reliability engineers, etc.) that investigate regressions with recent upgrades being executed on the resources in order to determine whether mitigation actions need to be taken to resolve the regressions. For instance, one of these aforementioned analysts is typically required to diagnose the root cause of a regression by reviewing and interpreting endless logs of telemetry data that show variations and/or deviations for a large number of metrics associated with the resources recently upgraded. This review process may also include some automation tools that perform analysis for further consideration.

Unfortunately, this manual review process is time consuming due to the amount of data to consider and the fact that many cloud-based platforms are growing rapidly. For instance, server farms increase in size and/or are continually added to expand the service being provided. This growth and the amount of data often outpaces the review and monitoring capacity required to identify a regression and to take action to mitigate the regression in an efficient manner. That is, it can take an extended period of time (e.g., upwards of a few hours) for an analyst to diagnose a regression and roll out a quick fix, such as a "hotpatch", to mitigate the regression. During this extended period of time, the potential for a sub-optimal user experience greatly increases (e.g., the service may go down, the service may perform slowly, a feature of the service may be unavailable, security vulnerabilities may be exposed, etc.).

It is with respect to these and other considerations that the disclosure made herein is presented.

SUMMARY

The techniques disclosed herein improve the user experience in the face of a regression by returning resources that offer a service to a "last known good" upgrade. In other words, the state of the resources that offer the service is reconfigured to scale back from one or more recent upgrades, the deployments of which likely caused the regression, to a previous upgrade that is known to have little or no effect on the user experience.

In various examples, the resources can include physical and/or virtual resources (e.g., processing, storage, and/or networking resources) that are divided into different resource "units". For instance, the resource units may be geographically dispersed server farms configured within different datacenters. An individual upgrade that is deployed to these different resource units is referred to herein as an upgrade event. As described above, an upgrade event may include updated code and/or other mechanisms configured to maintain, correct, add, and/or remove functionality (e.g., a feature) associated with a service being provided to customers.

In various examples, upgrade events may be deployed for a service in accordance with a schedule (e.g., every day, every week, every month, etc.). Moreover, upgrade events may be deployed (e.g., pushed) to different resource units in stages. For instance, one upgrade event may be deployed to: a first set of resource units (e.g., 10% of the total amount of resources) in a first wave at a first time, a second set of resource units (e.g., 20% of the total amount of resources or an additional 10% of the total amount of resources) in a second wave at a second time, a third set of resource units (e.g., 35% of the total amount of resources or an additional 15% of the total amount of resources) in a third wave at a third time, a fourth set of resource units (e.g., 55% of the total amount of resources or an additional 20% of the total amount of resources) in a fourth wave at a fourth time, a fifth set of resource units (e.g., 80% of the total amount of resources or an additional 25% of the total amount of resources) in a fifth wave at a fifth time, and a sixth set of resource units (e.g., 100% of the total amount of resources or the last 20% of the total amount of resources) in a sixth wave at a sixth time.

This approach to deploying upgrade events in different waves and at different times makes it possible to better monitor for, identify, and mitigate a regression caused by the upgrade event before the upgrade event is deployed to a large number of the resource units that make up the cloud-based platform. In various examples, the resource units can be assigned to an upgrade wave based on geography, type of service offered, identifications of users (e.g., customers) served, and/or security level of the service and/or data offered.

During the deployment of a first upgrade event in various waves, a second upgrade event may start to be deployed such that a series of upgrade events are deployed over time in a sequence. Accordingly, multiple different upgrade events can currently be deployed, or be in the process of being deployed, across various resource units that offer a service at any given time. The sequential nature of the upgrade events can be referred to as upgrade event N, upgrade event N−1, upgrade event N−2, upgrade event N−3, and so forth, where N is the most recent upgrade event. Accordingly, in most situations at a given time, the N upgrade event is likely deployed to the least amount of resource units, the N−1 upgrade event is likely deployed to the next least amount of resource units, the N−2 upgrade event is likely deployed to the next least amount of resource units, and so forth.

In the case where deployment of recent upgrade event(s) (e.g., upgrade event N, upgrade event N−1, etc.) has caused a problem, or includes a code regression, the system described herein enables a provider of the service to ensure the impact of the problem on the user experience is minimal by scaling back, or rolling back, the service configured on various resource units. This rollback switches execution of code associated with recent upgrade event(s) to execution of code associated with a last known good upgrade event.

To identify a problem, the system described herein is configured to collect, or receive, performance (e.g., telemetry) data from each of the resource units that make up the cloud-based platform. The performance data represents various metrics that are being monitored. The metrics being monitored may be indicative of a "health" of an individual resource unit. When healthy, the service being offered by the individual resource unit is functioning effectively and efficiently, thereby translating into an optimal user experience. However, when not healthy, the service being offered by the individual resource unit may be slow or unavailable, thereby translating into a sub-optimal user experience.

The system described herein can monitor and use performance data collected in association with any one of various metrics that are indicative of a health of a resource unit. In one example, a metric may include an unexpected number of errors that occur for a predefined time period (e.g., each minute, every five minutes, etc.). An unexpected error may be reported by a user of the service. For instance, a customer may provide feedback indicating that a requested operation was slow to be completed or unable to be completed. Alternatively, an unexpected error may be system detected. For instance, an automated detection feature of the service may determine that a particular function or feature provided via the service is unavailable due to a crash that occurs at a particular resource unit. In another example, a metric may include a Quality of Service (QoS) value established in accordance with any one of various QoS models used by the cloud-based platform. The QoS value is a measurement of the performance of the service for users during a predefined time period (e.g., each minute, every five minutes, etc.) based on monitored characteristics such as packet loss, bit rate, throughput, transmission delay, availability, and so forth.

The performance data associated with the metrics is collected for each of a plurality of upgrade events that are currently deployed (e.g., upgrade event N, upgrade event N−1, upgrade event N−2, upgrade event N−3, etc.). In most cases, when a sub-optimal user experience is noticed it can be attributed to the more recent upgrade event(s) (e.g., upgrade event N, upgrade event N−1, etc.). In this situation, the system can automatically and immediately scale back the code deployments for the resource units to a last known good upgrade event. Consequently, users will not experience or feel the impact of service interruptions caused by a problem. Meanwhile, an on-call engineer or site reliability engineer can look into the problem caused by the more recent upgrade event(s), and fix the problem so the more recent upgrade event(s) can eventually be re-deployed.

In order to identify the last known good upgrade event, the system is configured to continually track and analyze information collected for each of a set of deployed upgrade events, e.g., upgrade event N, upgrade event N−1, upgrade event N−2, upgrade event N−3, and so forth. This information is referred to herein as qualification data. The system can tag an upgrade event as the last known good (LKG) upgrade event when the collected qualification data satisfies one or more predefined qualifications. Accordingly, the tag may be referred to as an LKG tag.

For instance, one predefined qualification for the LKG tag can require the individual upgrade event to be deployed for a threshold number of days (e.g., five days, twenty days, thirty days, etc.). The number of deployment days begins to increase on the day when the upgrade event is initially deployed to a first set of resource units (e.g., in the first deployment wave). Another predefined qualification for the LKG tag can require the individual upgrade event to be deployed to a predetermined threshold percentage of resource units that offer the service (e.g., 50%, 60%, 70% etc. of the total number of resource units). The two qualifications mentioned above help ensure that there is sufficient use of an upgrade event, as well as enough performance data collected in association with the upgrade event, to allow for an elevated level of confidence that the LKG tag is assigned to an upgrade event that is not causing any impactful problems.

In various examples, an additional predefined qualification for the LKG tag can require that a number of user complaints received for an individual upgrade event be less than a predetermined threshold number of user complaints (e.g., one, ten, twenty, one hundred, etc.). A user complaint can be submitted to the system directly from the users of the service. Alternatively, a user complaint can come from a service support team that communicates with a user regarding the problem. Further, a predefined qualification for the LKG tag can require that a number of rollback requests be less than a predetermined threshold number of rollback requests.

Defining the qualifications can be dynamic and based on properties of the service and/or of the upgrade events (e.g., the type of upgrade events) being pushed in the sequence. For example, if the service stores sensitive data and/or the upgrade events are labeled as a high risk deployment (e.g., the upgrade events are for a security feature), then the threshold number of days can be thirty days. In contrast, if the service does not store sensitive data and/or the upgrade events are labeled as a low risk deployment (e.g., the upgrade events are for a little used ancillary feature), then the threshold number of days can be seven days. Similarly, if the service stores sensitive data and/or the upgrade events are labeled as a high risk deployment, then the predetermined threshold percentage of resource units to which the upgrade event needs to be deployed can be eighty percent. In contrast, if the service does not store sensitive data and/or the type of upgrade events are labeled as a low risk deployment, then then the predetermined threshold percentage of resource units to which the upgrade event needs to be deployed can be forty percent.

Consequently, the tagging method for a series of code deployments, as described herein, provides a mechanism to immediately and automatically return a configuration state of resource units that offer a service to a last known good state, in the face of a problem such as a code regression. In this way, the quality of service for users is maintained and the service provider can focus and take the necessary amount of time to properly fix the code regression without feeling rushed. In some examples, the configuration state may correspond to an individual feature or function of the service.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A is a diagram illustrating an example environment in which a system is configured to identify a last known good upgrade event in a sequence of upgrade events.

DETAILED DESCRIPTION

Figure 1B:
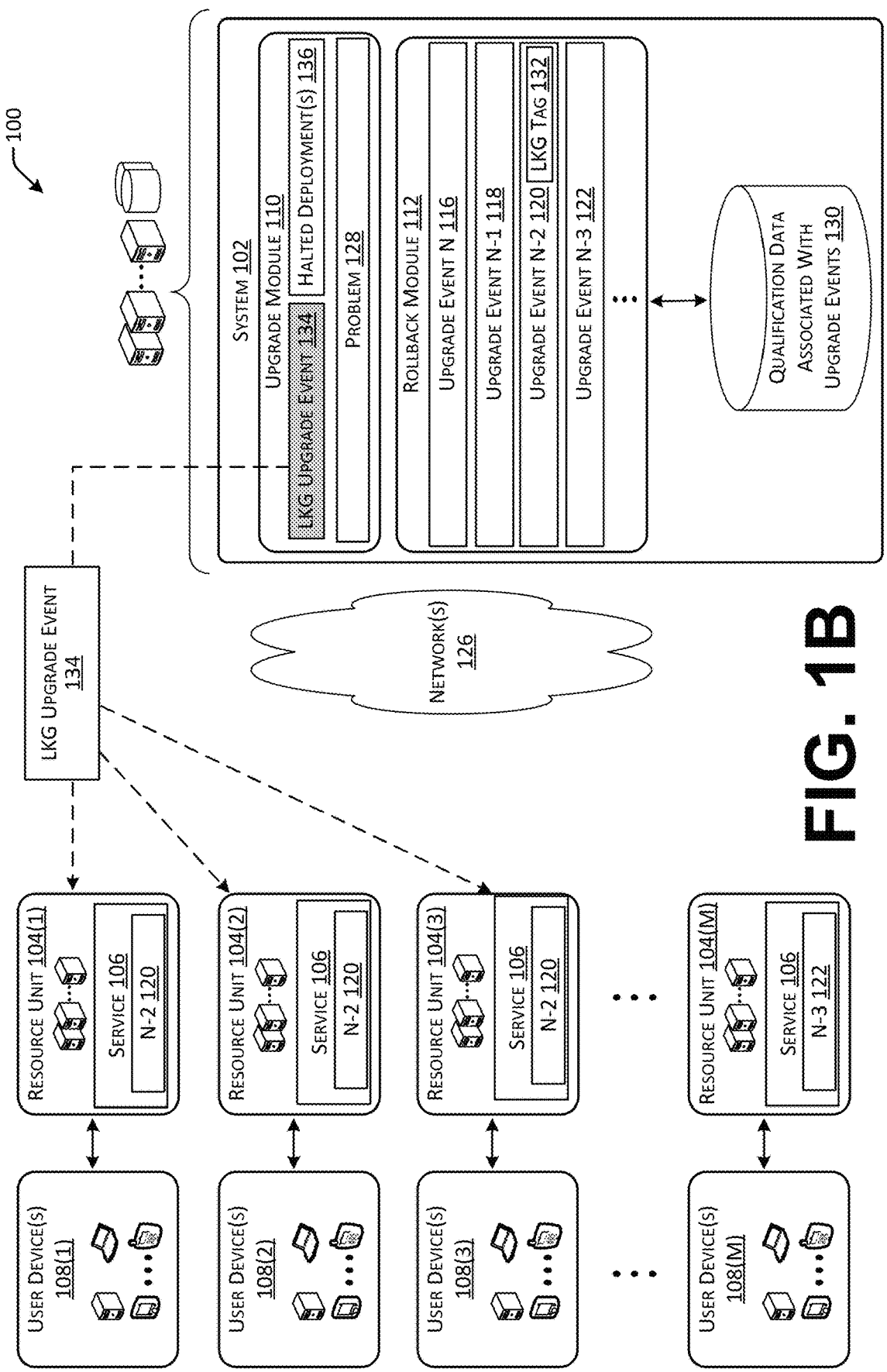
FIG. 1B is a diagram illustrating the example environment from FIG. 1A in which the system is configured to deploy the last known good upgrade event to resource units that offer a service in light of a problem such as a code regression.

The following Detailed Description discloses techniques and technologies for improving the user experience in the face of a regression by returning resources that offer a service to a "last known good" upgrade. In other words, the state of the resources that offer the service is reconfigured to scale back from one or more recent upgrades, the deployments of which likely caused the regression, to a previous upgrade that is known to have little or no effect on the user experience (e.g., a safe configuration state for the service or for a feature of the service). To identify a problem, the system described herein is configured to collect performance data from resource units that make up a cloud-based platform, or that are used by a service provider to provide a service. The performance data is collected for each upgrade event in a sequence of upgrade events that are currently deployed or being deployed (e.g., upgrade event N, upgrade event N-1, upgrade event N-2, upgrade event N-3, etc.). The system is further configured to continually track and analyze qualification data collected for each of the deployed upgrade events. The system can tag an upgrade event as the last known good (LKG) upgrade event when the collected qualification data satisfies one or more predefined qualifications.

Various examples, scenarios, and aspects that allow for the identification and deployment of the last known good upgrade event, in light of a problem such as a code regression, are described below with reference to FIGS. 1A-7.

FIG. 1A is a diagram illustrating an example environment 100 in which a system 102 is configured to identify a last known good upgrade event in a sequence of upgrade events. FIG. 1A illustrates various resource units 104(1-M) where M is a positive integer number (e.g., in the tens or hundreds or thousands). The resource units 104(1-M) may be different server farms, or some other division of resources, that comprise a cloud-based platform or other network system configured within the same and/or different datacenters, for example. Accordingly, a resource can include a server, a storage device, a virtual machine, a virtual network, networking equipment, and so forth, that is under control of an entity providing a service 106 and/or operating the system 102 configured to monitor the health of the service 106.

To this end, each of the resource units 104(1-M) provide the service 106 to respective user devices 108(1-M). In one example, the user devices 108(1-M) belongs to different users (e.g., customers or clients of the service 106) located in different geographical regions (e.g., different states, different countries, etc.). A user device may include an "on-premises" server device, a smartphone device, tablet computing device, a laptop computing device, a desktop computing device, an augmented reality device, a virtual reality device, a mixed reality device, a game console, a wearable device, an Internet-of-Things (IoT) device, and so forth.

The system 102 includes an upgrade module 110 and a rollback module 112. The upgrade module 110 is configured to deploy (e.g., push) upgrade events 114 to the different resource units 104(1-M). An individual upgrade event is often deployed to the resource units 104(1-M) in stages and/or in accordance with a schedule. For instance, an individual upgrade event may be deployed to: a first set of resource units (e.g., 10% of the total amount of resources) in a first wave at a first time, a second set of resource units (e.g., 20% of the total amount of resources or an additional 10% of the total amount of resources) in a second wave at a second time, a third set of resource units (e.g., 35% of the total amount of resources or an additional 15% of the total amount of resources) in a third wave at a third time, a fourth set of resource units (e.g., 55% of the total amount of resources or an additional 20% of the total amount of resources) in a fourth wave at a fourth time, a fifth set of resource units (e.g., 80% of the total amount of resources or an additional 25% of the total amount of resources) in a fifth wave at a fifth time, and a sixth set of resource units (e.g., 100% of the total amount of resources or the last 20% of the total amount of resources) in a sixth wave at a sixth time.

This approach to deploying an upgrade event in different waves and at different times makes it possible to better monitor for, identify, and mitigate a regression caused by the upgrade event before the upgrade event is deployed to a large number of the resource units that make up the cloud-based platform. In various examples, the resource units 104(1-M) can be assigned to an upgrade wave based on geography, identifications of users (e.g., customers) served, and/or security level of the service and/or data offered.

Furthermore, the upgrade event(s) 114 are part of a sequence of upgrade event(s) that incrementally improve the service 106 over a longer period of time. Consequently, the upgrade module 110 is configured to be deploying multiple upgrade events 114 to the resource units 104(1-M), in a staged manner, at any given time. The sequential nature of the upgrade events 114 is illustrated in the rollback module 112 as upgrade event N 116, upgrade event N-1 118, upgrade event N-2 120, upgrade event N-3 122, and so forth, where N is the most recent upgrade event in the sequence. Accordingly, in most situations at a given time, upgrade event N 116 is likely deployed to the least amount of resource units 104(1-M), upgrade event N-1 118 is likely deployed to the next least amount of resource units 104(1-M), upgrade event N-2 120 is likely deployed to the next least amount of resource units 104(1-M), and so forth.

FIG. 1A shows that at a particular point in time, the upgrade module 110 is deploying the most recent upgrade event N 116 to resource unit 104(1) and resource unit 104(2). As shown, the state of the service 106 configured on resource unit 104(1) and resource unit 104(2) reflects upgrade event N 116. In this example, the upgrade module 110 has already deployed upgrade event N-1 118 to resource unit 104(3), and may still be deploying upgrade event N-1 118 to other resource units not shown. Similarly, the upgrade module 110 has already deployed upgrade event N-3 122 to resource unit 104(M), and may still be deploying upgrade event N-3 122 to other resource units not shown. Note that the upgrade module 110 may also be deploying upgrade event N-2 120 to resource units not shown as well.

Again, this sequential approach to deploying the upgrade events 114 makes it possible for the system 102 and/or an analyst to identify and take action to mitigate a problem caused by one or multiple ones of the upgrade events 114 deployed to the resource units 104(1-M) that make up a cloud-based platform (e.g., GOOGLE DRIVE, MICROSOFT SHAREPOINT, DROPBOX, etc.). Stated alternatively, exposure of the problem to end users, e.g., user devices 108(1-M), can be limited if a problem is identified and mitigated early in the process of deploying the upgrade events 114 to the different resource units 104(1-M).

To identify the problem, the system 102 continually collects, or receives, performance data 124 from the respective resource units 104(1-M) that make up the cloud-based platform. The system 102 can comprise device(s) (e.g., servers, analyst devices, etc.) and/or other components that communicate with one another and/or with the resource units 104(1-M) via network(s) 126. The performance data 124 represents various metrics that are being monitored by the system 102. The metrics being monitored may be indicative of a "health" of an individual resource unit 104(1-M). When healthy, the service 106 being offered by the individual resource unit 104(1-M) is functioning effectively and efficiently, thereby translating into an optimal user experience. However, when not healthy, the service 106 being offered by the individual resource unit 104(1-M) may be slow or unavailable, thereby translating into a sub-optimal user experience.

In one example, a metric may include an unexpected number of errors that occur for a predefined time period (e.g., each minute, every five minutes, etc.). An unexpected error may be reported by a user of the service 106. For instance, a customer may provide feedback indicating that a requested operation was slow to be completed or unable to be completed. Alternatively, an unexpected error may be system detected. For instance, an automated detection feature of the service may determine that a particular function or feature provided via the service 106 is unavailable due to a crash that occurs at a particular resource unit. In another example, a metric may include a Quality of Service (QoS) value established in accordance with any one of various QoS models used by the cloud-based platform. The QoS value is a measurement of the performance of the service for users during a predefined time period (e.g., each minute, every five minutes, etc.) based on monitored characteristics such as packet loss, bit rate, throughput, transmission delay, availability, and so forth.

As shown, the performance data 124 associated with the metrics is collected for each of a plurality of upgrade events that are currently deployed (e.g., upgrade event N 116, upgrade event N-1 118, upgrade event N-2 120, upgrade event N-3 122, etc.). The performance data 124 can be analyzed to identify a problem 128, such as a code regression. In most cases, when a sub-optimal user experience is noticed, the problem 128 causing the sub-optimal user experience can be attributed to the more recent upgrade event(s) (e.g., upgrade event N 116 and/or upgrade event N-1 118, etc.). In this situation, it would be helpful to automatically and immediately scale back the code deployments for the resource units 104(1-M) to a safe state.

This safe state is captured by the concept of a last known good upgrade event. In order to identify the last known good upgrade event, the rollback module 112 is configured to continually track and analyze qualification data 130 collected for each of a set of deployed upgrade events, e.g., upgrade event N 116, upgrade event N-1 118, upgrade event N-2 120, upgrade event N-3 122, etc. The qualification data 130 can be stored in a database. The rollback module 112 can tag an upgrade event as the last known good (LKG) upgrade event when the collected qualification data 130 for the upgrade event satisfies one or more predefined qualifications. Accordingly, the tag may be referred to as an LKG tag.

In the example of FIG. 1A, the LKG tag 132 is applied to upgrade event N-2 120. Note that since the individual upgrade events in the sequence incrementally improve the service 106 (e.g., update and/or improve code with each iteration or version), the goal of the rollback module 112 is to identify the most recent upgrade event that qualifies as being safe, or is known to not cause any problems.

Consequently, the tagging method for a series of code deployments, as described herein, provides a mechanism to immediately and automatically return a configuration state of resource units 104(1-M) that offer a service 106 to a last known good state, in the face of a problem 128 such as a code regression. This helps ensure the impact of the problem on the user experience is minimal or non-existent. Stated alternatively, the quality of service for users is maintained and the service provider can focus and take the necessary amount of time to properly fix the code regression without feeling rushed. That is, an on-call engineer or site reliability engineer can look into the problem 128 caused by the more recent upgrade event(s), and fix the problem so the more recent upgrade event(s) can eventually be re-deployed.

The number of illustrated modules in the system 102 is just an example, and the number can vary higher or lower. That is, functionality described herein in association with the illustrated modules can be performed by a fewer number of modules or a larger number of modules on one device or spread across multiple devices.

FIG. 1B is a diagram illustrating the example environment 100 from FIG. 1A in which the system 102 is configured to deploy the last known good upgrade event to resource units that offer a service in light of a problem such as a code regression. As shown, the upgrade module 110 is configured to retrieve the last known good upgrade event 134 (e.g., upgrade event N−2 120 with LKG tag 132) and deploy the last known good upgrade event 134 to resource units 104(1-3) that had an upgrade event (e.g., upgrade event N 116 and/or upgrade event N−1 118) that caused the problem 128. In this way, the configuration state of the service 106 offered by resource units 104(1-3) is returned to a safe state (e.g., upgrade event N−2 120). Furthermore, the upgrade module 110 is configured to halt the deployment of the problematic upgrade events 136 (e.g., upgrade event N116 and/or upgrade event N−1 118). Note that, in some examples, the upgrade module 110 does not deploy the last known good upgrade event 134 to resource unit 104(M) because this resource unit 104(M) is operating an older upgrade event N−3 122 in the sequence that is known to be safe. In all likelihood, this resource unit 104(M) has not yet been scheduled to receive any of upgrade events N 116, N−1 118, and/or N−2 120.

Figure 2:
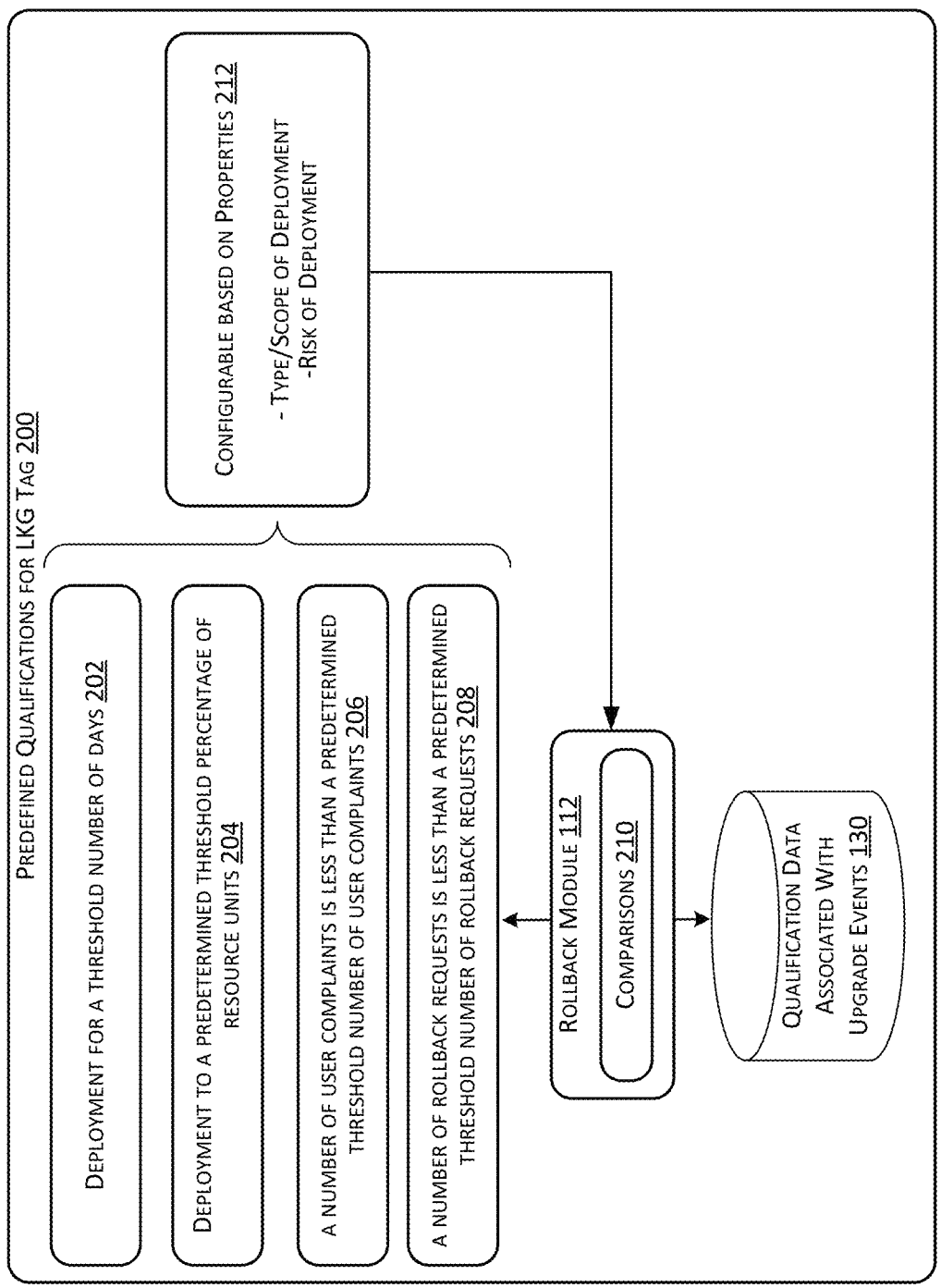
FIG. 2 is a block diagram illustrating examples of predefined qualifications used by the system to identify the last known good upgrade event.

FIG. 2 is a block diagram illustrating examples of predefined qualifications 200 used by the system to identify the last known good upgrade event, or to apply the last known good (LKG) tag to a safe upgrade event. A first example predefined qualification for the LKG tag can require the individual upgrade event to be deployed for a threshold number of days 202 (e.g., five days, twenty days, thirty days, etc.). The number of deployment days begins to increase on the day when the upgrade event is initially deployed (i.e., day zero). Another example predefined qualification for the LKG tag can require the individual upgrade event to be deployed to a predetermined threshold percentage of resource units 204 that offer the service (e.g., 50%, 60%, 70% etc. of the total number of resource units). The two qualifications mentioned above help ensure that there is sufficient use of an upgrade event, as well as enough performance data collected in association with the upgrade event, to allow for an elevated level of confidence that the LKG tag 132 is appropriately assigned to an upgrade event that is not causing any impactful problems.

An additional example predefined qualification for the LKG tag can require that a number of user complaints received for an individual upgrade event be less than a predetermined threshold number of user complaints 206 (e.g., one, ten, twenty, one hundred, etc.). A user complaint can be submitted to the rollback module 112 directly from the users of the service 106. Alternatively, a user complaint can come from a service support team that communicates with a user regarding the problem. Further, an example predefined qualification for the LKG tag can require that a number of rollback requests be less than a predetermined threshold number of rollback requests 208.

As FIG. 2 illustrates, the rollback module 112 is configured to perform comparisons 210 of the qualification data 130 tracked and updated over a period of time (e.g., in a real-time manner), and the values set for the qualifications. These comparisons 210 yield the most recent upgrade event that qualifies as the last known good upgrade event, so the LKG tag 132 can be applied accordingly.

Defining the qualifications can be dynamic and based on properties 212 of the service and/or of the upgrade events (e.g., the type of upgrade events) being pushed in the sequence. For instance, the threshold values for the aforementioned qualifications 202, 204, 206, 208 can depend on a type or scope of deployment (e.g., identifications of service features being upgraded via the sequence of upgrade events). Moreover, the threshold values for the aforementioned qualifications 202, 204, 206, 208 can depend on a risk level associated with the deployment. In a more specific example, if the service stores sensitive data and/or the upgrade events are labeled as a high risk deployment (e.g., the upgrade events are for a security feature), then the threshold number of days can be thirty days. In contrast, if the service does not store sensitive data and/or the upgrade events are labeled as a low risk deployment (e.g., the upgrade events are for a little used ancillary feature), then the threshold number of days can be seven days.

Similarly, if the service stores sensitive data and/or the upgrade events are labeled as a high risk deployment, then the predetermined threshold percentage of resource units to which the upgrade event needs to be deployed can be eighty percent. In contrast, if the service does not store sensitive data and/or the type of upgrade events are labeled as a low risk deployment, then then the predetermined threshold percentage of resource units to which the upgrade event needs to be deployed can be forty percent.

Figure 3A:
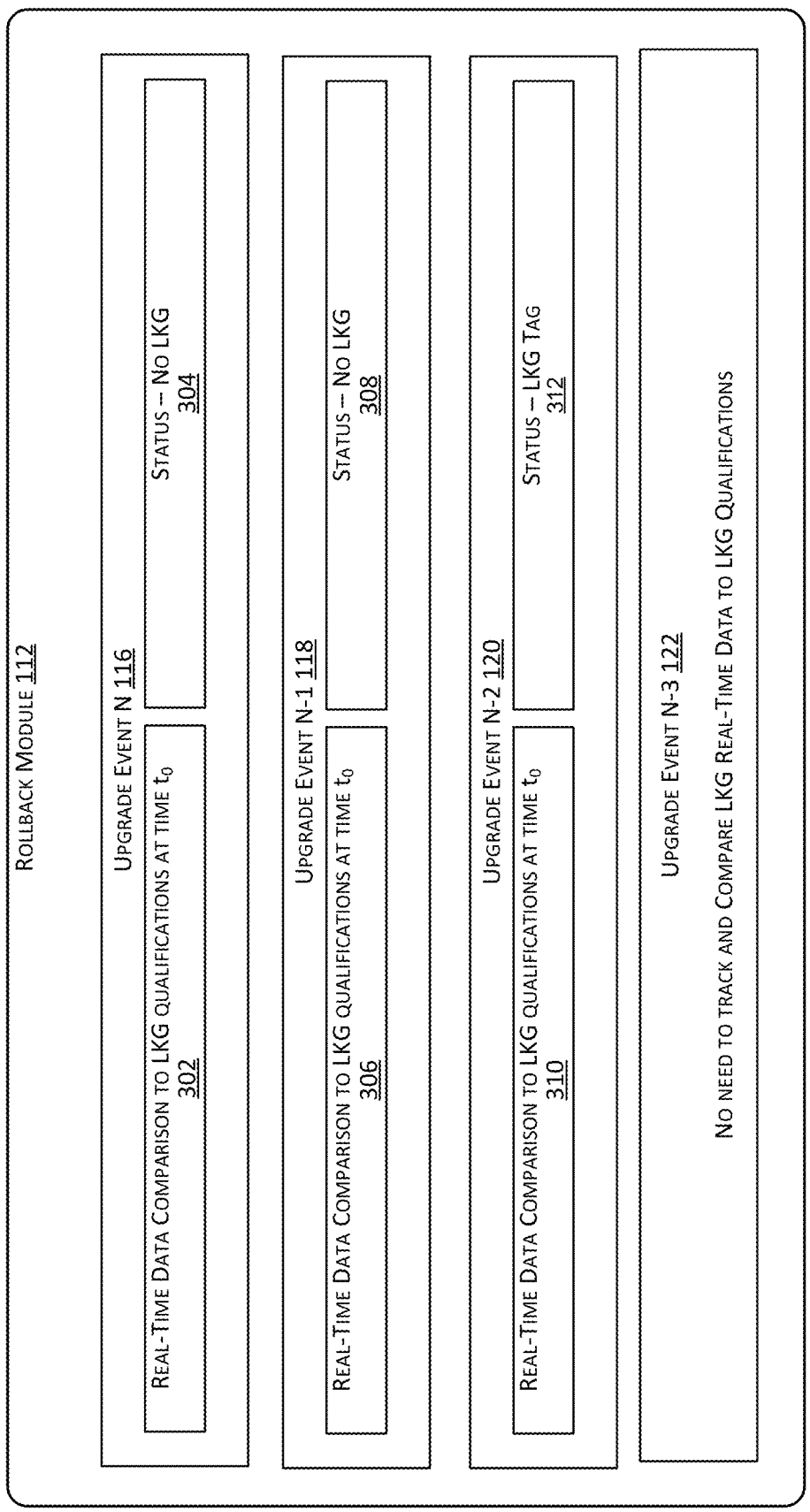
FIG. 3A is a block diagram illustrating how a system can configure a status with regard to a last known good upgrade event, for each of a plurality of upgrade events being deployed in a sequence.

FIG. 3A is a block diagram illustrating how a system can configure a status with regard to a last known good upgrade event, for each of a plurality of upgrade events being deployed in a sequence. As shown, the rollback module 112 compares real-time qualification data to LKG qualifications for each of upgrade events N 116, N−1 118, and N−2 120. That is, the rollback module 112 first compares 302 real-time qualification data for upgrade event N 116 to LKG qualifications (e.g., threshold values) at time to. This first comparison 302 results in a status determination that upgrade event N 116 is not the last known good upgrade event 304. Next, the rollback module 112 compares 306 real-time qualification data for upgrade event N−1 118 to LKG qualifications at time to. This comparison 306 results in a status determination that upgrade event N−1 118 is also not the last known good upgrade event 308. Next, the rollback module 112 compares 310 of real-time qualification data for upgrade event N−2 120 to LKG qualifications at time to. This comparison 310 results in a status determination that upgrade event N−2 120 is the last known good upgrade event 312.

Note that since upgrade event N−2 120 is already tagged as the last known good upgrade event 312, and upgrade event N−3 122 occurred in the sequence before upgrade event N−2 120, then the rollback module 112 does not need to further consider upgrade event N−3 122 for the LKG tag. That is, the rollback module 112 does not need to track qualification data for upgrade event N−3 122 and/or make comparisons similar to those described above with respect to the other upgrade events.

Figure 3B:
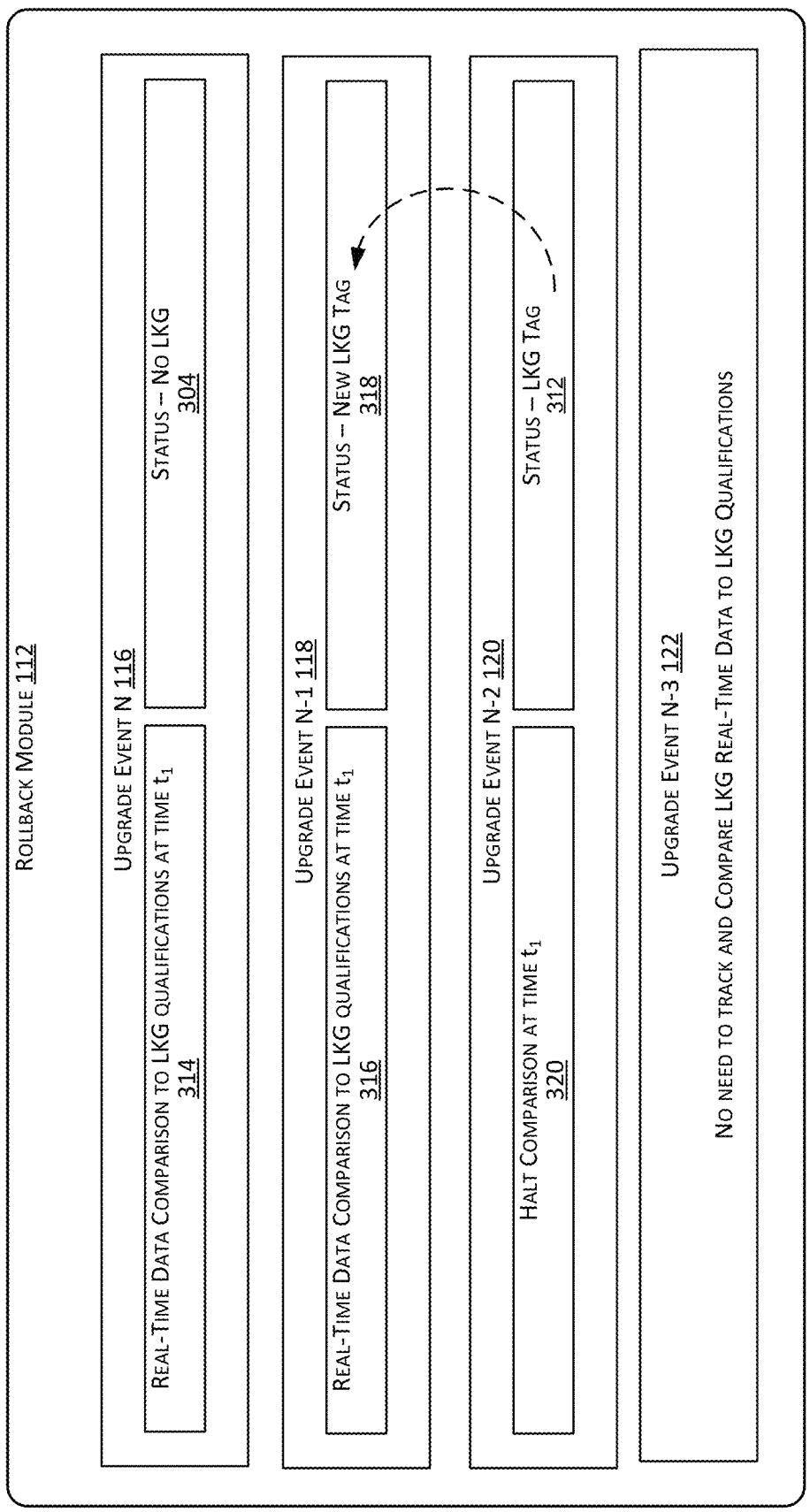
FIG. 3B is a block diagram illustrating how a system can update a status with regard to a last known good upgrade event, for each of a plurality of upgrade events being deployed in a sequence, as more qualification data is collected.

FIG. 3B is a block diagram illustrating how a system can update a status with regard to a last known good upgrade event, for each of a plurality of upgrade events being deployed in a sequence, as more qualification data is collected. FIG. 3B illustrates considerations by the rollback module 112 that occur at a later time $t_1$ compared to time to in FIG. 3A. In FIG. 3B, the rollback module 112 first compares 314 real-time qualification data for upgrade event N 116 to LKG qualifications (e.g., threshold values) at time $t_1$. This first comparison 314 continues to result in a status determination that upgrade event N 116 is not the last known good upgrade event 304 (i.e., no change in status compared to time to from FIG. 3A). Next, the rollback module 112 compares 316 real-time qualification data for upgrade event N−1 118 to LKG qualifications at time $t_1$. This comparison 316 results in a status determination that upgrade event N−1 118 is now the new last known good upgrade event 318. Accordingly, a new LKG tag is applied to upgrade event N−1 118, or the rollback module 112 moves the LKG tag from upgrade event N−2 to upgrade event N−1 based on updated real-time qualification data.

Accordingly, since upgrade event N−1 118 is now tagged as the last known good upgrade event 318, and upgrade event N−2 120 occurred in the sequence before upgrade event N−1 118, then the rollback module 112 can halt the previous comparison being made for upgrade event N−2 120, as referenced by 320. Similar to upgrade event N−3 122, there is no need for the rollback module 112 to track qualification data for upgrade event N−2 120 and/or make comparisons.

Figure 4:
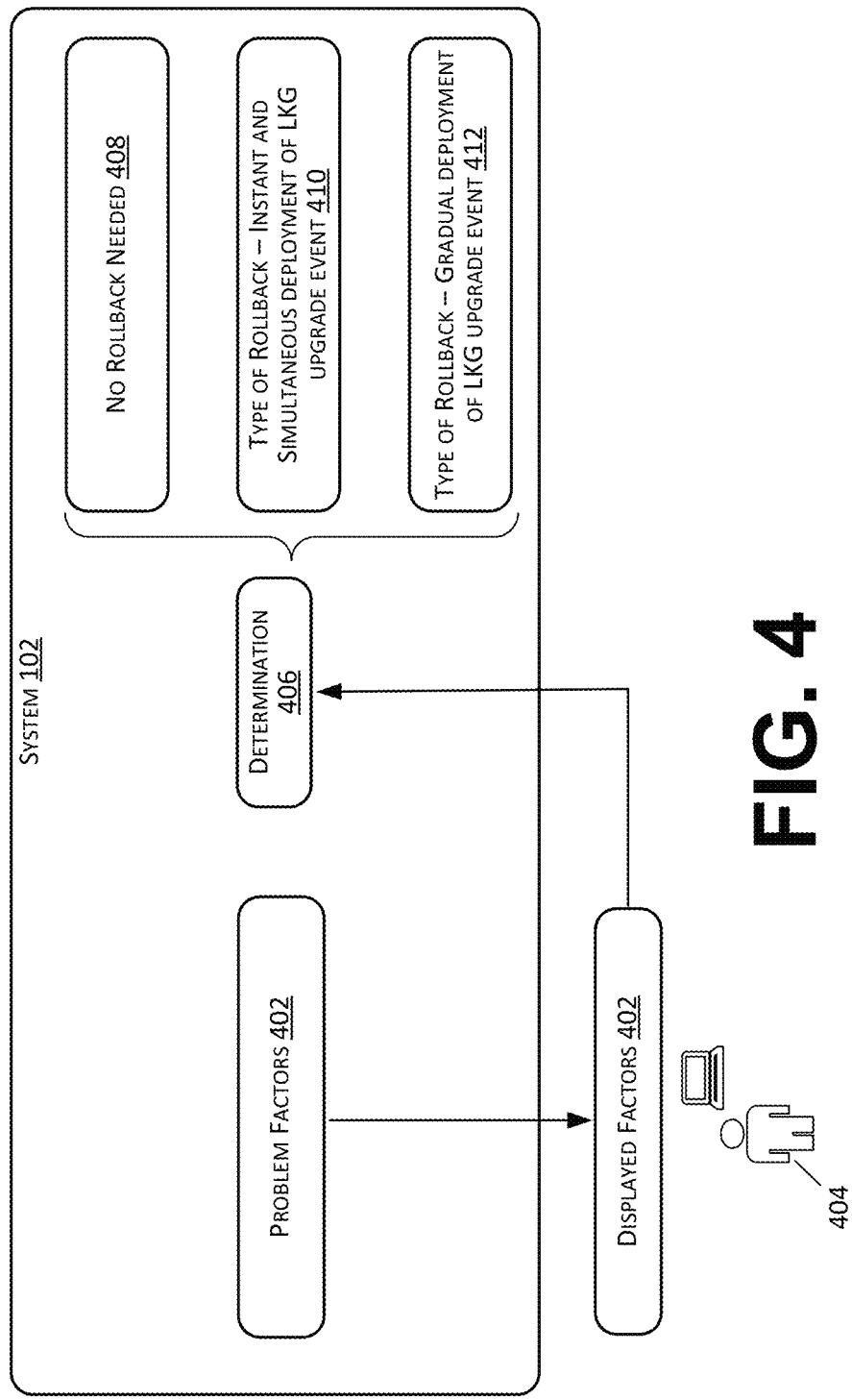
FIG. 4 is a block diagram illustrating how a system can use an analyst to evaluate factors and confirm that a rollback should be implemented in response to a problem.

FIG. 4 is a block diagram illustrating how a system 102 can use an analyst to evaluate factors and confirm that a rollback should be implemented in response to a problem. As shown, the system 102 can identify factors 402 associated with a problem 128 and pass the factors 402 on so they are displayed to an analyst 404. The analyst 404 can be an on-call engineer and/or a site reliability engineer. Accordingly, the analyst 404 is configured to evaluate the factors and determine 406 the next course of action. In one example, a problem may have no meaningful impact on the user experience, and thus, the analyst 404 can determine that no rollback to the last known good upgrade event is needed 408. In another example, a problem may have an easy fix, and thus, the analyst 404 can determine that no rollback to the last known good upgrade event is needed 408 after the fix is quickly applied.

In other examples, the analyst 404 may determine that a rollback to the last known good upgrade event is needed. In this scenario, the analyst 404 may select between different types of rollback. For instance, a first type of rollback 410 may instantly and simultaneously deploy the last known good upgrade event to all the resource units 104(1-M). This may be a resource-intensive task, but may be needed if the factors 402 indicate the problem 128 poses a severe risk (e.g., a security issue). A second type of rollback 412 may gradually deploy the last known good upgrade event to resource units 104(1-M) in stages or waves. More specifically, the rollback can be implemented based on geography (e.g., server farm locations) or based on customer resources (e.g., more important customers may have their resources rolled back first).

Figure 5:
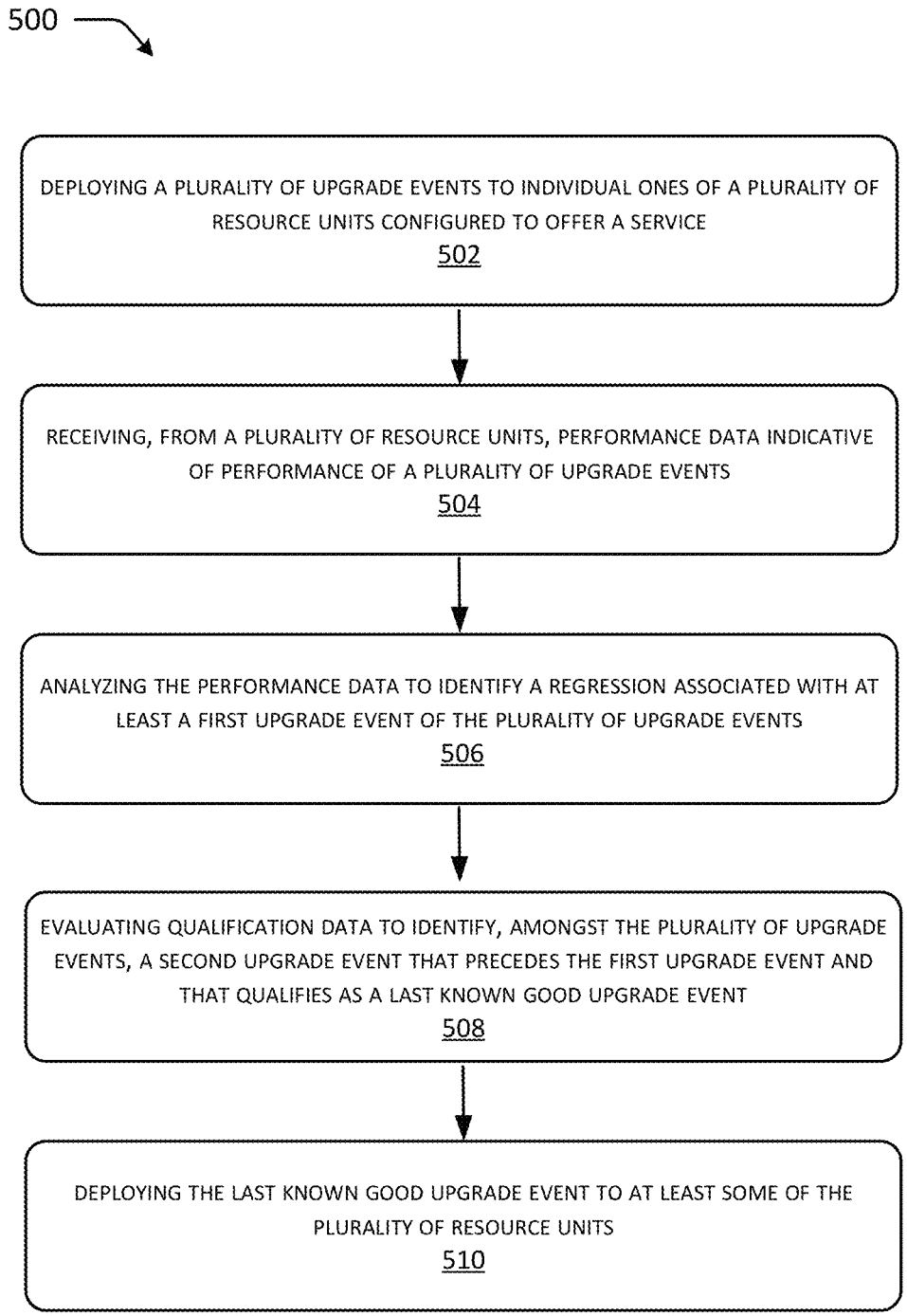
FIG. 5 is a flow diagram of an example method for identifying and deploying the last known good upgrade event to resource units that offer a service in light of a problem such as a code regression.

FIG. 5 is a flow diagram illustrating routines describing aspects of the present disclosure. The logical operations described herein with regards to FIG. 5 can be implemented (1) as a sequence of computer implemented acts or program modules running on a device and/or (2) as interconnected machine logic circuits or circuit modules within a device.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

FIG. 5 is a flow diagram of an example method 500 for identifying and deploying the last known good upgrade event to resource units that offer a service in light of a problem such as a code regression.

At operation 502, a plurality of upgrade events in a sequence are in the process of being deployed to individual ones of a plurality of resource units configured to offer a service.

At operation 504, performance data indicative of performance of the plurality of upgrade events is received from the plurality of resource units.

At operation 506, the performance data is analyzed to identify a regression associated with at least a first upgrade event of the plurality of upgrade events.

At operation 508, qualification data is evaluated to identify, amongst the plurality of upgrade events, a second upgrade event that precedes the first upgrade event and that qualifies as a last known good upgrade event.

At operation 510, the last known good upgrade event is deployed to at least some of the plurality of resource units (e.g., the ones executing code associated with the first upgrade event).

Figure 6:
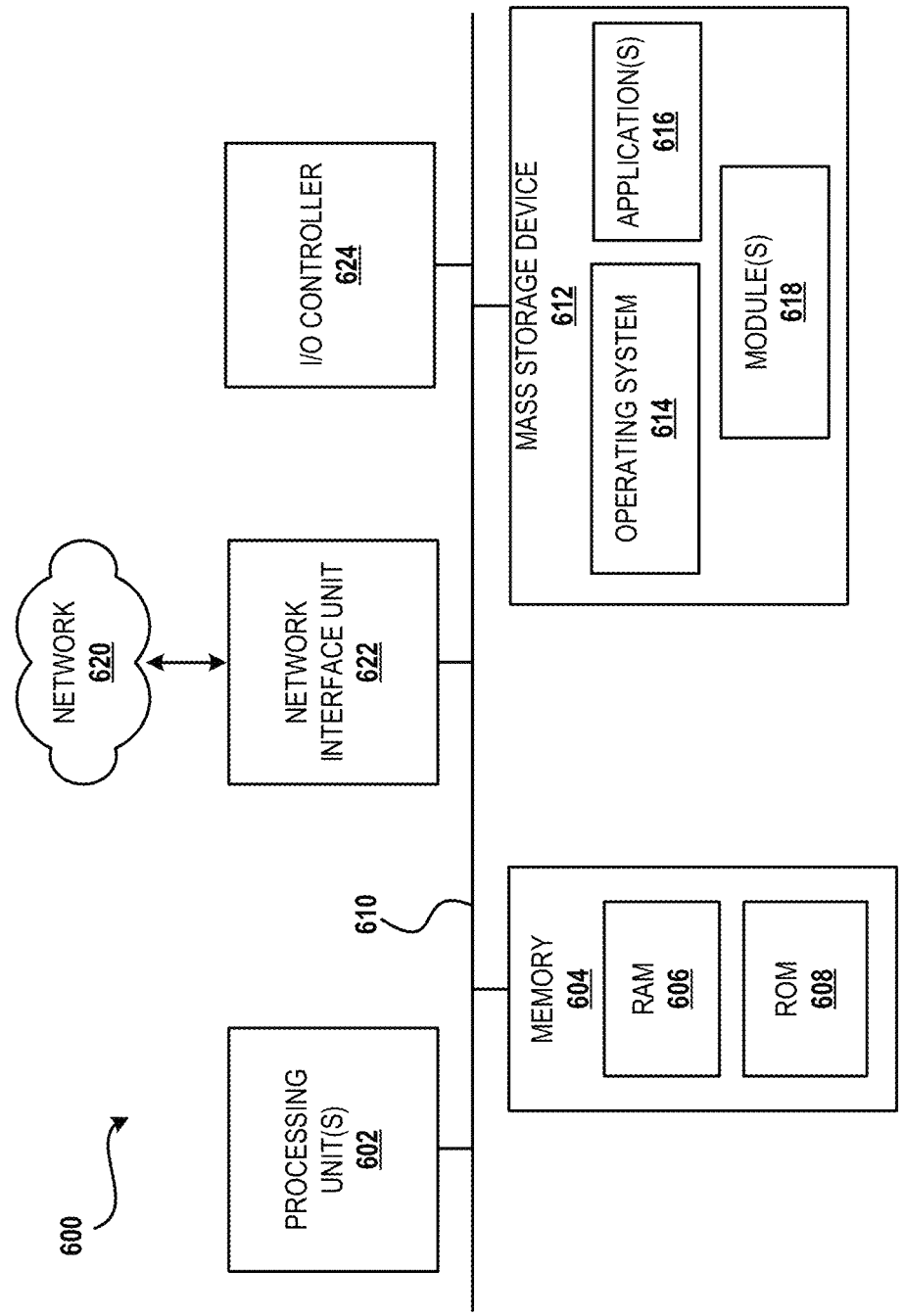
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the system 102, capable of executing computer instructions (e.g., a module or a program component described herein). The computer architecture 600 illustrated in FIG. 6 includes processing unit(s) 602, a system memory 604, including a random access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPUtype processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618 (e.g., the upgrade module 110, the rollback module 112), and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
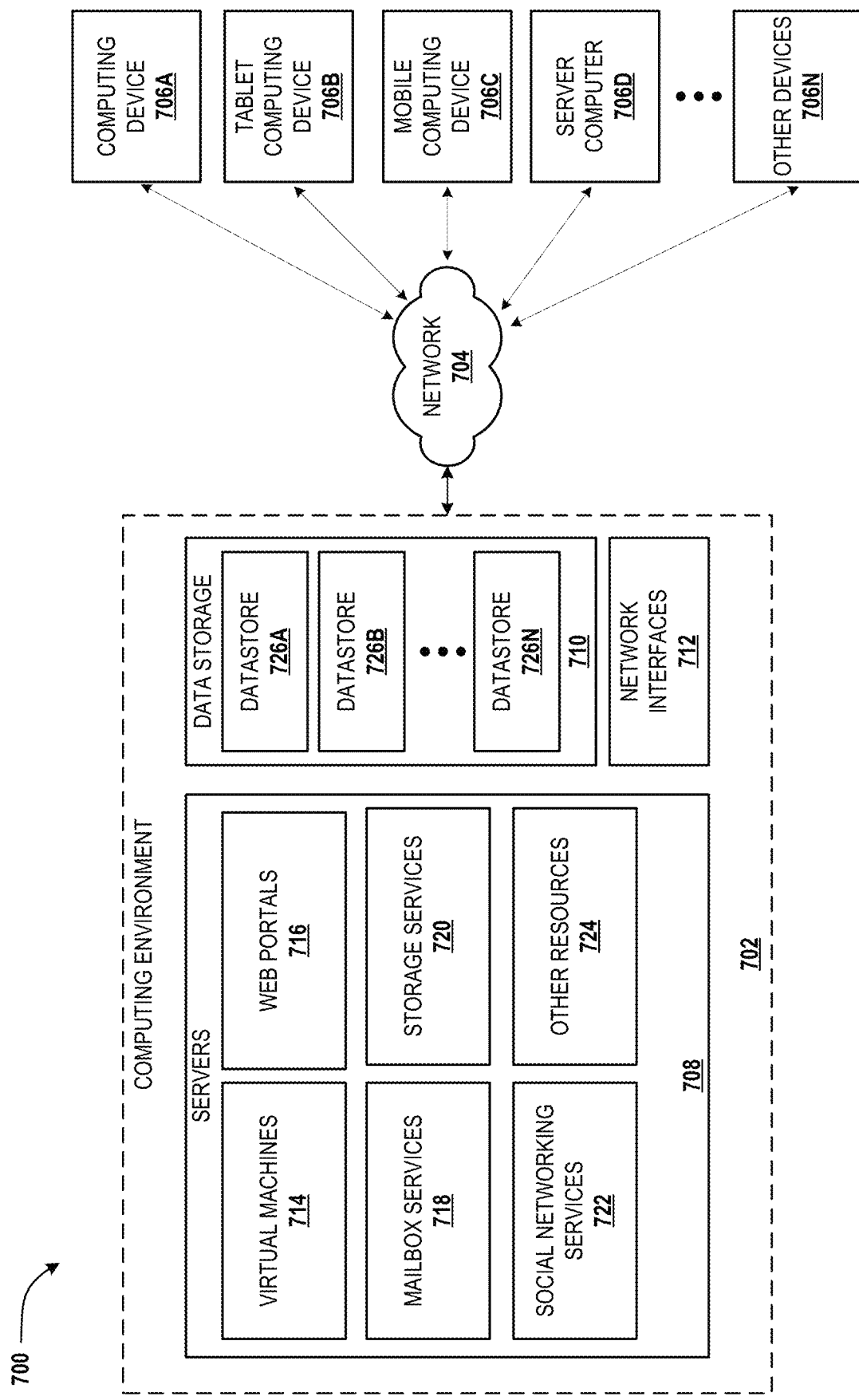
FIG. 7 is a diagram illustrating a distributed computing environment capable of implementing aspects of the techniques and technologies presented herein.

FIG. 7 depicts an illustrative distributed computing environment 700 within which the techniques described herein can be implemented. For example, the distributed computing environment 700 can includes resources that can provide a service to user devices. Moreover, the health of the resources can be monitored by a health center (e.g., the system 102 in FIG. 1A).

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

The disclosure presented herein also encompasses the subject matter set forth in the following clauses.

Example Clause A, a method comprising: receiving, from a plurality of resource units, performance data indicative of performance of a plurality of upgrade events; analyzing the performance data to identify a regression associated with at least a first upgrade event of the plurality of upgrade events; evaluating, by one or more processing units, qualification data to identify, amongst the plurality of upgrade events, a second upgrade event that precedes the first upgrade event and that qualifies as a last known good upgrade event; and deploying the last known good upgrade event to at least some of the plurality of resource units.

Example Clause B, the method of Example Clause A, wherein the qualification data indicates that a predetermined number of days has elapsed since the second upgrade event was first deployed to a resource unit of the plurality of resource units.

Example Clause C, the method of Example Clause A or Example Clause B, wherein the qualification data indicates that the second upgrade event has been deployed to a predetermined threshold percentage of the plurality of resource units.

Example Clause D, the method of any one of Example Clauses A through C, wherein the qualification data indicates that the second upgrade event has received a number of user complaints that is less than a predetermined threshold number of user complaints.

Example Clause E, the method of any one of Example Clauses A through D, wherein the qualification data indicates that the second upgrade event has received a number of rollback requests that is less than a predetermined threshold number of rollback requests.

Example Clause F, the method of any one of Example Clauses A through E, further comprising: applying a last known good tag to the second upgrade event; re-evaluating the qualification data at a later time to identify, amongst the plurality of upgrade events, a third upgrade event that qualifies as the last known good upgrade event; and moving the last known good tag from the second upgrade event to the first upgrade event.

Example Clause G, the method of any one of Example Clauses A through F, further comprising: providing information associated with the regression to an analyst; and receiving, based on input from the analyst, confirmation that a rollback is needed, wherein deployment of the last known good upgrade event to the at least some of the plurality of resource units is implemented based on the received confirmation.

Example Clause H, the method of Example Clause G, wherein the confirmation selects a type of rollback from a group that includes a gradual rollback where the last known good upgrade event is deployed in stages over time or an instant rollback where the last known good upgrade event is deployed to all of the at least some of the plurality of resource units instantly and concurrently.

Example Clause I, the method of any one of Example Clauses A through H, wherein the at least some of the plurality of resource units are ones executing code associated with the first upgrade event.

Example Clause J, a system comprising: one or more processing units; and computer-readable storage media storing instructions, that when executed by the one or more processing units, configure the system to perform operations comprising: identifying a regression associated with a first upgrade event in a sequence of upgrade events currently being deployed to a plurality of resource units that offer a service; evaluating qualification data to identify, amongst the sequence of upgrade events that are currently being deployed to the plurality of resource units, a second upgrade event that satisfies one or more predefined qualifications configured to apply a last known good tag, wherein the second upgrade event precedes the first upgrade event in the sequence of upgrade events; applying the last known good tag to the second upgrade event; and deploying, based on the application of the last known good tag to the second upgrade event and the identification of the regression associated with the first upgrade event, the second upgrade event to at least some of the plurality of resource units.

Example Clause K, the system of Example Clause J, wherein a predefined qualification requires a predetermined number of elapsed days since the second upgrade event was first deployed to a resource unit of the plurality of resource units.

Example Clause L, the system of Example Clause J or Example Clause K, wherein a predefined qualification requires the second upgrade event to have been deployed to a predetermined threshold percentage of the plurality of resource units.

Example Clause M, the system of any one of Example Clauses J through L, wherein a predefined qualification requires the second upgrade event to have received a number of user complaints that is less than a predetermined threshold number of user complaints.

Example Clause N, the system of any one of Example Clauses J through M, wherein a predefined qualification requires the second upgrade event to have received a number of rollback requests that is less than a predetermined threshold number of rollback requests.

Example Clause O, the system of any one of Example Clauses J through N, wherein the operations further comprise: providing information associated with the regression to an analyst; and receiving, based on input from the analyst, confirmation that a rollback is needed, wherein deployment of the second upgrade event to the at least some of the plurality of resource units is implemented based on the received confirmation.

Example Clause P, the system of Example Clause O, wherein the confirmation selects a type of rollback from a group that includes a gradual rollback where the second upgrade event is deployed in stages over time or an instant rollback where the second upgrade event is deployed to all of the at least some of the plurality of resource units instantly and concurrently.

Example Clause Q, the system of any one of Example Clauses J through P, wherein the at least some of the plurality of resource units are ones executing code associated with the first upgrade event.

Example Clause R, a system comprising: one or more processing units; and computer-readable storage media storing instructions, that when executed by the one or more processing units, configure the system to perform operations comprising: receiving, from a plurality of resource units, performance data indicative of performance of a plurality of upgrade events; analyzing the performance data to identify a regression associated with at least a first upgrade event of the plurality of upgrade events; evaluating qualification data to identify, amongst the plurality of upgrade events, a second upgrade event that precedes the first upgrade event and that qualifies as a last known good upgrade event; and deploying the last known good upgrade event to at least some of the plurality of resource units.

Example Clause S, the system of Example Clause R, wherein the operations further comprise: providing information associated with the regression to an analyst; and receiving, based on input from the analyst, confirmation that a rollback is needed, wherein deployment of the last known good upgrade event to the at least some of the plurality of resource units is implemented based on the received confirmation.

Example Clause T, the system of Example Clause S, wherein the confirmation selects a type of rollback from a group that includes a gradual rollback where the second upgrade event is deployed in stages over time or an instant rollback where the second upgrade event is deployed to all of the at least some of the plurality of resource units instantly and concurrently.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resource units, two different upgrade events, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method comprising:
   receiving, from a plurality of resource units, performance data indicative of performance of a plurality of upgrade events;
   analyzing the performance data to identify a regression associated with at least a first upgrade event of the plurality of upgrade events;
   evaluating, by one or more processing units and at a first time, qualification data to identify, amongst the plurality of upgrade events, a second upgrade event that precedes the first upgrade event and that qualifies as a last known good upgrade event;
   applying a last known good tag to the second upgrade event;
   deploying the second upgrade event to at least some of the plurality of resource units;
   re-evaluating, at a second time that is after the first time, the qualification data to identify, amongst the plurality of upgrade events, a third upgrade event that precedes the first upgrade event and that qualifies as the last known good upgrade event, the third upgrade event following the second upgrade event; and moving the last known good tag from the second upgrade event to the third upgrade event.

2. The method of claim 1, wherein the qualification data indicates that a predetermined number of days has elapsed since the second upgrade event or the third upgrade event was first deployed to a resource unit of the plurality of resource units.

3. The method of claim 1, wherein the qualification data indicates that the second upgrade event or the third upgrade event has been deployed to a predetermined threshold percentage of the plurality of resource units.

4. The method of claim 1, wherein the qualification data indicates that the second upgrade event or the third upgrade event has received a number of user complaints that is less than a predetermined threshold number of user complaints.

5. The method of claim 1, wherein the qualification data indicates that the second upgrade event or the third upgrade event has received a number of rollback requests that is less than a predetermined threshold number of rollback requests.

6. The method of claim 1, further comprising:
providing information associated with the regression to an analyst; and
receiving, based on input from the analyst, confirmation that a rollback is needed, wherein deployment of the second upgrade event to the at least some of the plurality of resource units is implemented based on the confirmation.

7. The method of claim 6, wherein the confirmation selects a type of rollback from a group that includes a gradual rollback where the second upgrade event is deployed in stages over time or an instant rollback where the second upgrade event is deployed to all of the at least some of the plurality of resource units instantly and concurrently.

8. The method of claim 1, wherein the at least some of the plurality of resource units are ones executing code associated with the first upgrade event.

9. A system comprising:
one or more processing units; and
computer-readable storage media storing instructions, that when executed by the one or more processing units, configure the system to perform operations comprising:
identifying a regression associated with a first upgrade event in a sequence of upgrade events currently being deployed to a plurality of resource units that offer a service;
evaluating qualification data to identify, amongst the sequence of upgrade events that are currently being deployed to the plurality of resource units, a second upgrade event that satisfies one or more predefined qualifications configured to apply a last known good tag, wherein the second upgrade event precedes the first upgrade event in the sequence of upgrade events;
applying the last known good tag to the second upgrade event;
deploying, based on the application of the last known good tag to the second upgrade event and the identification of the regression associated with the first upgrade event, the second upgrade event to at least some of the plurality of resource units;
re-evaluating the qualification data to identify, amongst the sequence of upgrade events that are currently being deployed to the plurality of resource units, a third upgrade event that satisfies the one or more predefined qualifications configured to apply the last known good tag, wherein the third upgrade event precedes the first upgrade event in the sequence of upgrade events and follows the second upgrade event in the sequence of upgrade events; and
moving the last known good tag from the second upgrade event to the third upgrade event.

10. The system of claim 9, wherein a predefined qualification requires a predetermined number of elapsed days since the second upgrade event or the third upgrade event was first deployed to a resource unit of the plurality of resource units.

11. The system of claim 9, wherein a predefined qualification requires the second upgrade event or the third upgrade event to have been deployed to a predetermined threshold percentage of the plurality of resource units.

12. The system of claim 9, wherein a predefined qualification requires the second upgrade event or the third upgrade event to have received a number of user complaints that is less than a predetermined threshold number of user complaints.

13. The system of claim 9, wherein a predefined qualification requires the second upgrade event or the third upgrade event to have received a number of rollback requests that is less than a predetermined threshold number of rollback requests.

14. The system of claim 9, wherein the operations further comprise:
providing information associated with the regression to an analyst; and
receiving, based on input from the analyst, confirmation that a rollback is needed, wherein deployment of the second upgrade event to the at least some of the plurality of resource units is implemented based on the confirmation.

15. The system of claim 14, wherein the confirmation selects a type of rollback from a group that includes a gradual rollback where the second upgrade event is deployed in stages over time or an instant rollback where the second upgrade event is deployed to all of the at least some of the plurality of resource units instantly and concurrently.

16. The system of claim 9, wherein the at least some of the plurality of resource units are ones executing code associated with the first upgrade event.

17. The system of claim 9, wherein the operations further comprise deploying, based on the last known good tag being moved to the third upgrade event, the third upgrade event to the at least some of the plurality of resource units.

18. A system comprising:
one or more processing units; and
computer-readable storage media storing instructions, that when executed by the one or more processing units, configure the system to perform operations comprising:
receiving, from a plurality of resource units, performance data indicative of performance of a plurality of upgrade events;
analyzing the performance data to identify a regression associated with at least a first upgrade event of the plurality of upgrade events;
evaluating, at a first time, qualification data to identify, amongst the plurality of upgrade events, a second upgrade event that precedes the first upgrade event and that qualifies as a last known good upgrade event;
applying a last known good tag to the second upgrade event;
deploying the second upgrade event to at least some of the plurality of resource units;

re-evaluating, at a second time that is after the first time, the qualification data to identify, amongst the plurality of upgrade events, a third upgrade event that precedes the first upgrade event and that qualifies as the last known good upgrade event, the third upgrade event following the second upgrade event; and moving the last known good tag from the second upgrade event to the third upgrade event.

19. The system of claim 18, wherein the operations further comprise:

providing information associated with the regression to an analyst; and receiving, based on input from the analyst, confirmation that a rollback is needed, wherein deployment of the second upgrade event to the at least some of the plurality of resource units is implemented based on the confirmation.

20. The system of claim 19, wherein the confirmation selects a type of rollback from a group that includes a gradual rollback where the second upgrade event is deployed in stages over time or an instant rollback where the second upgrade event is deployed to all of the at least some of the plurality of resource units instantly and concurrently.

* * * * *